(12) United States Patent
Naruse et al.

(10) Patent No.: US 7,380,587 B2
(45) Date of Patent: Jun. 3, 2008

(54) VEHICLE AIR CONDITIONER

(75) Inventors: Shinji Naruse, Kariya (JP); Makoto Uto, Ichinomiya (JP); Takashi Yamamoto, Okazaki (JP); Hisashi Tanaka, Anjo (JP); Yoshinori Yanagimachi, Takahama (JP); Yasuhiko Niimi, Handa (JP)

(73) Assignee: Denso Corporation, Kariya (JP)

( * ) Notice: Subject to any disclaimer, the term of this patent is extended or adjusted under 35 U.S.C. 154(b) by 532 days.

(21) Appl. No.: 11/210,002

(22) Filed: Aug. 23, 2005

(65) Prior Publication Data

US 2006/0042788 A1    Mar. 2, 2006

(30) Foreign Application Priority Data

Aug. 25, 2004   (JP)   ............................. 2004-245667
Apr. 20, 2005   (JP)   ............................. 2005-122967

(51) Int. Cl.
*B60H 1/00*   (2006.01)
(52) U.S. Cl. .................... 165/202; 165/203; 62/244; 236/49.3
(58) Field of Classification Search ................ 165/202, 165/203, 204; 62/244, 239, 228.1; 236/49.3
See application file for complete search history.

(56) References Cited

U.S. PATENT DOCUMENTS

| | | | | |
|---|---|---|---|---|
| 6,012,297 A * | 1/2000 | Ichishi et al. | ............... | 165/203 |
| 6,390,380 B2 * | 5/2002 | Ichishi et al. | ............... | 236/49.3 |
| 6,491,578 B2 * | 12/2002 | Yoshinori et al. | ........... | 165/203 |
| 6,550,686 B2 * | 4/2003 | Kawai et al. | ............... | 236/49.3 |
| 6,719,624 B2 * | 4/2004 | Hayashi et al. | ............... | 62/239 |
| 6,793,016 B2 * | 9/2004 | Aoki et al. | ................. | 165/202 |
| 7,174,733 B2 * | 2/2007 | Oomura et al. | ............ | 62/228.1 |
| 7,275,983 B2 * | 10/2007 | Aoki et al. | ................... | 62/244 |

* cited by examiner

*Primary Examiner*—Ljiljana (Lil) V Ciric
(74) *Attorney, Agent, or Firm*—Harness, Dickey & Pierce, PLC (57) ABSTRACT

An air conditioner for a vehicle is provided with an air conditioning unit for blowing conditioned air to a passenger compartment of the vehicle, multiple seat air conditioning units for respectively controlling temperatures of seats of the vehicle, and a control unit for controlling the air conditioning unit and the seat air conditioning units. The larger the difference between a target blowing-out temperature of the air conditioning unit and a compartment setting temperature of the passenger compartment, the larger the degree of influence of the target blowing-out temperature on a seat target blowing-out temperature in the calculation of the seat target blowing-out temperature, based on which the seat air conditioning unit is controlled.

17 Claims, 4 Drawing Sheets

SEAT TARGET BLOWING-OUT TEMPERATURE (TAOseat)

FIG. 7

INSIDE AIR TEMPERATURE (Tr)

VEHICLE AIR CONDITIONER

CROSS REFERENCE TO RELATED APPLICATION

This application is based on Japanese Patent Applications No. 2004-245667 filed on Aug. 25, 2004 and No. 2005-122967 filed on Apr. 20, 2005, the disclosure of which is incorporated herein by reference.

FIELD OF THE INVENTION

The present invention relates to a vehicle air conditioner, which includes a seat air conditioning unit in addition to an air conditioning unit for blowing conditioned air to a passenger compartment.

BACKGROUND OF THE INVENTION

Generally, a vehicle air conditioner is provided with an air conditioning unit for blowing conditioned air to a passenger compartment, a seat air conditioning unit for controlling temperature of a seat where a passenger sits, and a control unit for controlling the air conditioning unit and the seat air conditioning unit, for example, referring to JP-2002-144849A.

The control unit determines the operation state (transient state or steady state) of the air conditioning unit, then changing the control state of the seat air conditioning unit according to the determined result. Thus, an excessive cooling operation and an excessive heating operation of the seat air conditioning unit are restricted when the air conditioning unit is in the steady state.

In this case, the transient state (e.g., immediately after a start of the vehicle air conditioner) means that a difference between a temperature in the passenger compartment and a setting temperature of the passenger compartment is large. In the transient state, a degree of alienation between a target blowing-out temperature TAO (calculated by control unit) of the air conditioning unit and the setting temperature of the passenger compartment is large. The steady state means that the difference between the temperature in the passenger compartment and the setting temperature of the passenger compartment becomes small with an operation of the vehicle air conditioner or the like. In the steady state, the degree of alienation between the target blowing-out temperature TAO of the air conditioning unit and the setting temperature is relatively small.

However, in the vehicle air conditioner, the control unit determines the operation state (transient state or steady state) of the air conditioning unit, then providing different control operations responding to the determined result. Therefore, in this case, the air conditioning control is complicated.

SUMMARY OF THE INVENTION

In view of the above-described disadvantage, it is an object of the present invention to provide a vehicle air conditioner, in which an excessive cooling operation and an excessive heating operation of a seat air conditioning unit are restricted in a steady state without performing a complex control.

According to the present invention, an air conditioner for a vehicle includes an air conditioning unit for blowing temperature-conditioned air to a passenger compartment of the vehicle, at least one seat air conditioning unit for controlling temperatures of seats of the vehicle, a compartment heat-load detecting device for detecting heat loads of the passenger compartment and outputting detection values corresponding to the heat loads of the passenger compartment, a seat heat-load detecting device by which heat loads of the seat is detected, a compartment temperature setting unit through which a compartment setting temperature of the passenger compartment is set by a passenger, and a control unit, by which air conditioning controls of the air conditioning unit and the seat air conditioning unit are performed and introduced into a steady state from a transient state. The control unit controls the air conditioning unit and the seat air conditioning unit responding to the detection values of the heat loads of the passenger compartment. The seat heat-load detecting device outputs detection values corresponding to the heat loads of the seat. The control unit includes a target blowing-out temperature calculation unit and a seat target blowing-out temperature calculation unit. The target blowing-out temperature calculation unit calculates a target blowing-out temperature of the temperature-conditioned air based on the detection values of the heat loads of the passenger compartment and the compartment setting temperature. The seat target blowing-out temperature calculation unit calculates a seat target blowing-out temperature of the seat based on at least the target blowing-out temperature and one of the detection values of the heat loads of the seat. In a calculation of the seat target blowing-out temperature by the seat target blowing-out temperature calculation unit, the seat target blowing-out temperature is more influenced by the target blowing-out temperature when a value indicating a degree of the transient state indicates that the air conditioning control more deviates from the steady state.

Accordingly, when the operation state of the air conditioning unit is in the transient state where the difference between the target blowing-out temperature and the compartment setting temperature is large, the target blowing-out temperature is relatively significantly reflected in the seat target blowing-out temperature. On the other hand, when the operation state of the air conditioning unit is in the steady state where the difference between the target blowing-out temperature and the compartment setting temperature is small, the target blowing-out temperature is relatively slightly reflected in the seat target blowing-out temperature.

Therefore, when the air conditioning unit is in a transient state where the difference between the target blowing-out temperature and the compartment setting temperature is relatively large, the seat target blowing-out temperature is more influenced by the target blowing-out temperature. Thus, the seat air conditioning unit is also in a transient state, where a temperature of conditioned air for the seat is relatively low at a cooling operation or relatively high at a heating operation thereof. In the case where the air conditioning unit is in the steady state, an excessive cooling operation and an excessive heating operation of the seat air conditioning unit can be restricted. Thus, a complex control for determining the operation state (transient state or steady state) of the air conditioning unit can be omitted.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

A first embodiment of the present invention will be described with reference to FIGS. 1-7. An air conditioner for a vehicle includes an air conditioning unit 21 for blowing temperature-conditioned air (conditioned air) to a passenger compartment of the vehicle, and multiple seat air conditioning units 4 for respectively controlling temperatures of seats (e.g. seat 3 shown in FIG. 1) of the vehicle.

Figure 1:
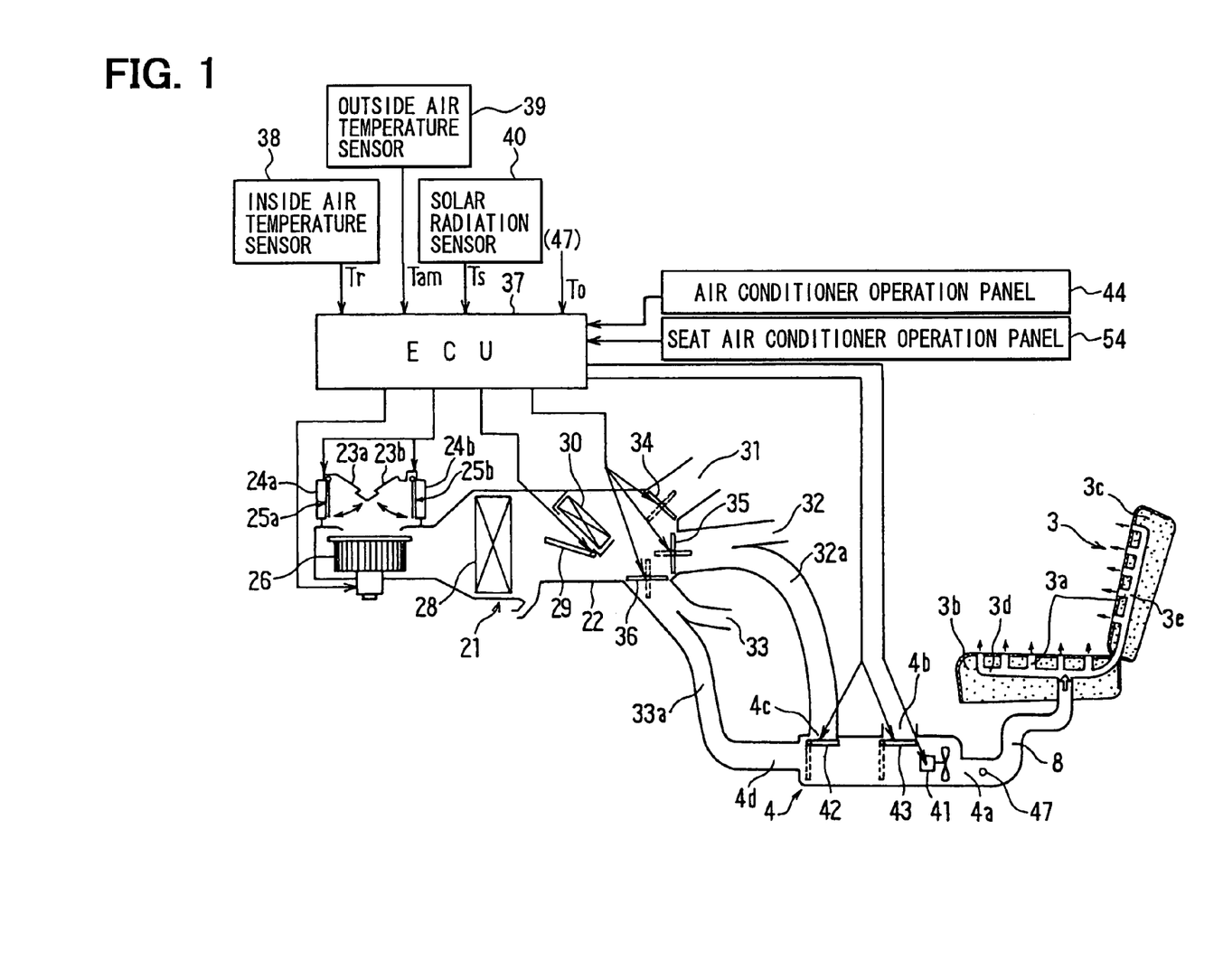
FIG. 1 is a schematic view showing a construction of a vehicle air conditioner according to a first embodiment of the present invention.

As shown in FIG. 1, the air conditioning unit 21 is provided with outside air intake ports 23a and 23b, through which air (outside air) outside the passenger compartment is introduced into the air conditioning unit 21, and inside air intake ports 24a and 24b, through which air (inside air) in the passenger compartment is introduced into the air conditioning unit 21. The intake ports 23a, 23b, 24a and 24b are arranged at the air upstream side of an air-blowing duct 22. The intake ports 23a, 23b, 24a and 24b are selectively opened and closed by inside-outside air switching doors 25a and 25b, so that a mix proportion between outside air and inside air which are drawn through the intake ports 23a, 23b, 24a and 24b is adjusted.

A blower 26 is arranged in the air-blowing duct 22. An evaporator 28 for a refrigerant cycle (not shown), an air mixing door 29, and a heater core 30, through which engine cooling water is circulated, are arranged at the air downstream side of the blower 26. An opening degree of the air mixing door 29 is adjustable, so that a mix proportion between air passing the heater core 30 and air bypassing the heater core 30 can be adjusted. Thus, temperature of conditioned air is adjusted.

A defroster opening 31, a face opening 32 and a foot opening 33 are arranged at the air downstream side of the duct 22. The defroster opening 31 is connected to a defroster blowing-out port (not shown) by a duct, so that conditioned air can be blown to a front windshield of the vehicle through the defroster blowing-out port. The face opening 32 is connected to a face blowing-out port (not shown) by a duct, so that conditioned air can be blown to an upper half of a passenger. The foot blowing-out port 33 is connected to a foot blowing-out port (not shown) through a duct, so that conditioned air can be blown to a lower half of the passenger. Control doors 34, 35 and 36 are respectively arranged at the air upstream side of the openings 31, 32 and 33.

The air conditioning unit 21 is controlled by an electrical control unit 37 (ECU). Heat loads of the passenger compartment, for example, a solar radiation amount Ts, an inside air temperature Tr and an outside air temperature Tam, are respectively detected by a solar radiation detection unit 40 (e.g., solar radiation sensor), an inside air temperature detection unit 38 (e.g., inside air temperature sensor), an outside air temperature detection unit 39 (e.g., outside air temperature sensor) and the like, which constitute a compartment heat-load detecting device. The detection values of the compartment heat-load detecting device are to be sent to the ECU 37 (control unit).

Moreover, operation signals from an air conditioner operation panel 44 are input to the ECU 37. The air conditioner operation panel 44 is arranged at a substantial center portion of an instrument panel (not shown) of the vehicle.

Figure 2:
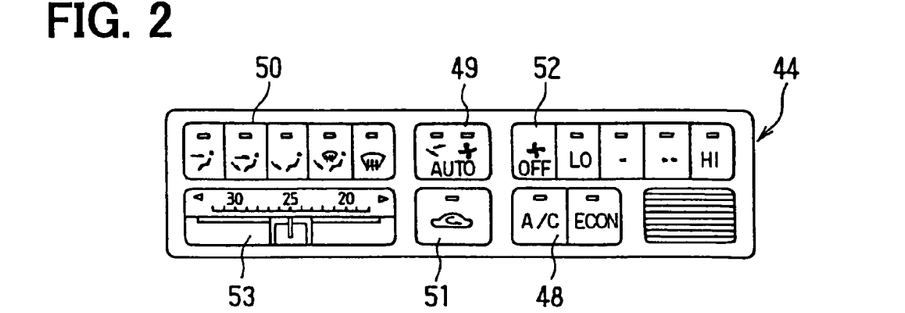
FIG. 2 is a front view showing an air conditioner operation panel of an air conditioning unit according to the first embodiment.

As shown in FIG. 2, the air conditioner panel 44 is provided with a A/C switch 48 for turning on/off the air conditioning unit 21, an auto-switch 49 for switching an operation mode between an automatic operation and a manual operation, multiple (e.g., five) blowing-out mode switches 50, an air-introducing mode switch 51, through which an air introduction mode can be manually switched between an outside air introduction and an inside air circulation, an air-blowing switch 52, through which an air-blowing amount of the air conditioning unit 21 can be manually adjusted, and a compartment temperature setting unit 53 (e.g., compartment temperature setting switch), through which a compartment setting temperature Tset of the passenger compartment can be manually set by the passenger. The compartment setting temperature is to be a target temperature of an air-conditioning control of the air conditioning unit 21. The blowing-out mode switches 50 are provided for annually selectively switching one mode among multiple air outlet modes including a face mode, a bi-level mode, a foot mode, an auto-defroster mode, a defroster mode and the like.

The switching through the blowing-out mode switches 50, the air-introducing mode switch 51 and the air-blowing switch 52 can be automatically controlled through an operation of the auto-switch 49.

A seating portion 3b and a back portion 3c of the seat 3 are respectively provided with multiple air blowing-out ports 3a, which are supplied with warm air, cool air or blown air by the seat air conditioning unit 4. Each of the air blowing-out port 3a disposed at the seating portion 3b is communicated with an air passage 3d formed in the seating portion 3b. Each of the air blowing-out ports 3a disposed at the back portion 3c is communicated with an air passage 3e formed in the back portion 3c. The air passages 3d and 3e are communicated with each other.

The air passages 3d and 3e are communicated with an outlet 4a of the seat air conditioning unit 4 through an air supply duct 8, for example. With reference to FIG. 1, the air supply duct 8 protrudes from a bottom surface of the seat 3. Alternatively, the air supply duct 8 can also protrude from a side surface of the seat 3. More alternatively, the outlet 4a (or seat air conditioning unit 4) can be also arranged at a lower portion of the seating portion 3b, so that the air supply duct 8 is omitted.

The seat air conditioning unit 4 is provided with an inside air intake port 4b, a cool air introduction port 4c and a warm air introduction port 4d, which are arranged at the air upstream side of the outlet 4a. Air (inside air) inside the passenger compartment can be drawn into the air upstream side of the outlet 4a through the inside air intake port 4b. The cool air introduction port 4c is communicated with a cool air duct 32a, which is branched from the face opening 32. The warm air introduction port 4d is communicated with a warm air duct 33a, which is branched from the foot opening 33.

A cool/warm air control door 42 is arranged at the air downstream side of the introduction ports 4c and 4d. An inside air control door 43 is arranged at the air downstream side of the inside air intake port 4b. A blower 41 is arranged at the air downstream side of the cool/warm air control door 42 and the inside air control door 43. Opening degrees of the cool/warm air control door 42 and the inside air control door 43 are adjustable. Thus, inside air, air (cool air) from the cool air duct 32a and air (warm air) from the warm air duct 33a are adjustably blown to the seat 3 by the blower 41.

A seat blowing-out temperature sensor 47 for detecting a temperature To (seat blowing-out temperature) of air blown to the seat 3 is arranged near the outlet 4a. The control doors 42 and 43 are driven by an actuator such as a servomotor (not shown).

Each of the seats (e.g., front right seat, front left seat, rear right seat and rear left seat) of the vehicle can be provided with the seat air conditioning unit 4 (numbered four, for example), which can be embedded in the seat or arranged thereout.

Each of the seat air conditioning units 4 can be provided with a seat air conditioner operation panel 54. The seat air conditioner operation panels 54 (numbered four, for example) are respectively arranged, for example, at inner side portions of front doors of the vehicle and a center portion of rear seats of the vehicle. Thus, each of the seat air conditioning units 4 can be freely adjusted by the passenger sitting on the corresponding seat.

Figure 3A:
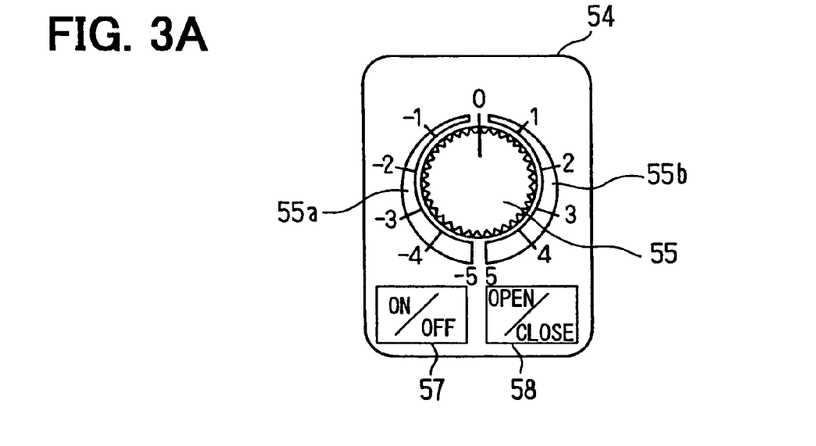
FIG. 3A is a front view showing a seat air conditioner operation panel of a seat air conditioning unit according to the first embodiment.

As shown in FIG. 3A, the seat air conditioner operation panel 54 is provided with a seat temperature setting unit 55 (e.g., seat temperature setting switch) for manually setting a seat setting temperature Sset of the seat 3, a seat air conditioner operation switch 57 for turning on/off the seat air conditioning unit 4, and an inside air switch 58 for opening/closing the inside air intake port 4b by driving the inside air control door 43.

Figure 3B:
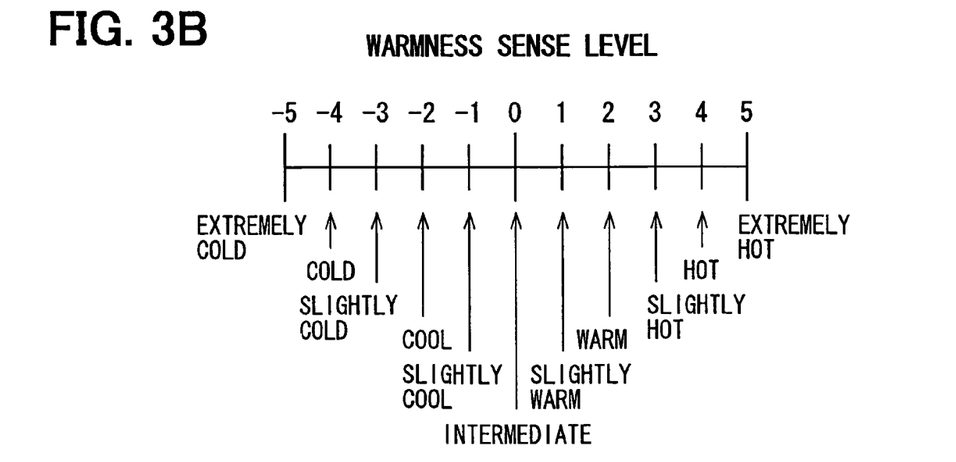
FIG. 3B is a graph showing a relationship between a warmness sense level of a passenger and a seat setting temperature.

The seat temperature setting switch 55 is constructed of, for example, a rotation-type dial switch, and provided with a cool zone 55a or a warm zone 55b. The seat setting temperature Sset of the seat 3 can be selectively set in one of the cool zone 55a and the warm zone 55b through the seat temperature setting switch 55. The seat air conditioning unit 4 is used for temperature-conditioning a contact surface of the seat 3. Considering that it exists a variation in individual warmth sense of passengers, the selection range from the cool zone 55a to the warm zone 55b is indicated by a cool degree or a warmth degree with respect to an average temperature (e.g., 25° C.) as a criterion. As shown in FIG. 3B, the passenger warmth sense is ranked into, for example, eleven ranks in the selection range. In this case, the cool zone 55a is ranked into five ranks (indicated by numbers "−1"-"−5", for example) from a somewhat cool rank to a considerably cold rank, and the warm zone 55b is ranked into five ranks (indicated by numbers from "1"-"5", for example) from a somewhat warm rank to a considerably hot rank.

Thus, the seat setting temperature Sset of the seat 3 can be set by selecting one of the ranks through the seat temperature setting switch 55. For example, when the passenger feels cold, the seat temperature setting switch 55 (for setting seat setting temperature Sset) can be adjusted to "2". When the passenger feels warm, the seat temperature setting switch 55 can be adjusted to "−4". Thus, the seat air conditioning unit 4 can be precisely controlled.

In this embodiment, the multiple seat air conditioner operation panels 54 are connected with the ECU 37. The seat air conditioning units 4 and the air conditioning unit 21 are correlatively controlled, based on input signals of the seat air conditioner operation panel 54 of the one seat air conditioning unit 4, which is firstly turned on through the seat air conditioner operation switch 57 thereof.

In this case, the other seat air conditioning units 4 will be operated corresponding to the one seat air conditioning unit 4 which is firstly turned on, even when the seat air conditioner operation switches 57 of the other seat air conditioning units 4 are ON. That is, the other seat air conditioning units 4 do not receive the input signals of their own seat temperature setting switches 55, while receiving the input signals of the seat air conditioner operation panel 54 of the one seat air conditioning unit 4 which is firstly turned on.

Air inside the passenger compartment can be introduced into the seat air conditioning unit 4 and blown to the seat 3 by an operation of the inside air switch 58. When the inside air switch 58 is ON, the inside air control door 43 is rotated to wholly open the inside air intake port 4b so that air inside the passenger compartment is introduced.

The ECU 37 is mainly constructed of a microcomputer having an embedded ROM (not shown) and the like. A control program for the air conditioning unit 21 and the seat air conditioning unit 4 is memorized in the ROM and executed by the ECU 37. In this case, a blowing-out temperature control and an air blowing-out amount control of the seat air conditioning unit 4 are performed responding to the seat setting temperature Sset set by the passenger, while a blowing-out temperature control of the air conditioning unit 21 is performed.

Figure 4:
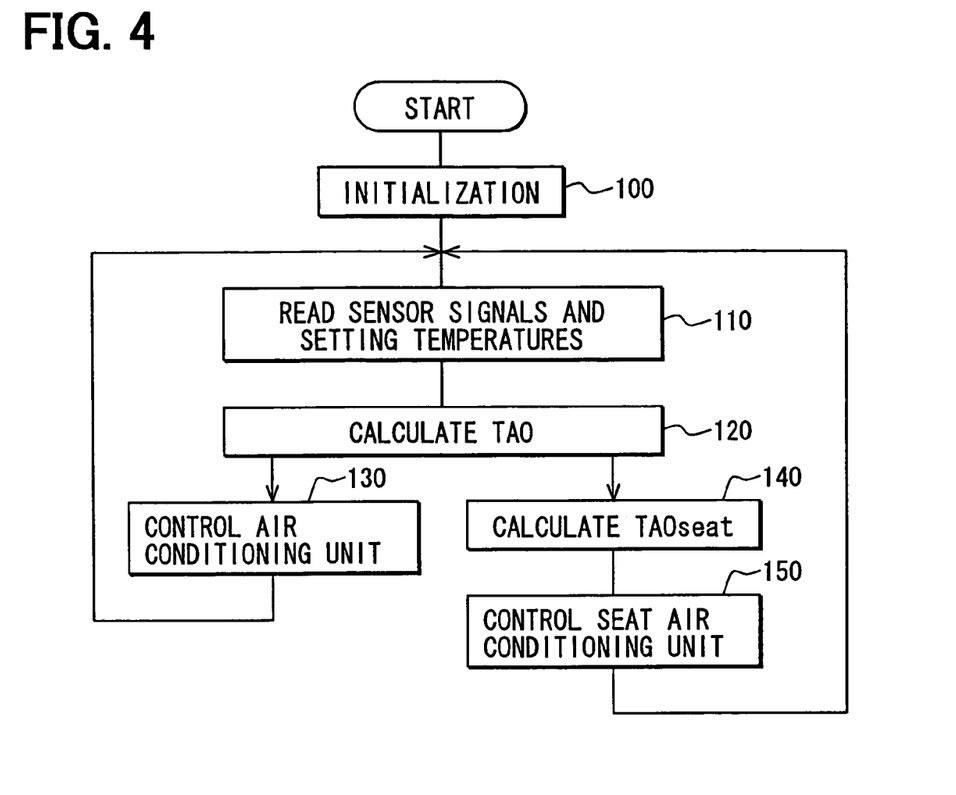
FIG. 4 is a flow chart showing an air conditioning control operation by an ECU according to the first embodiment.
Figure 5:
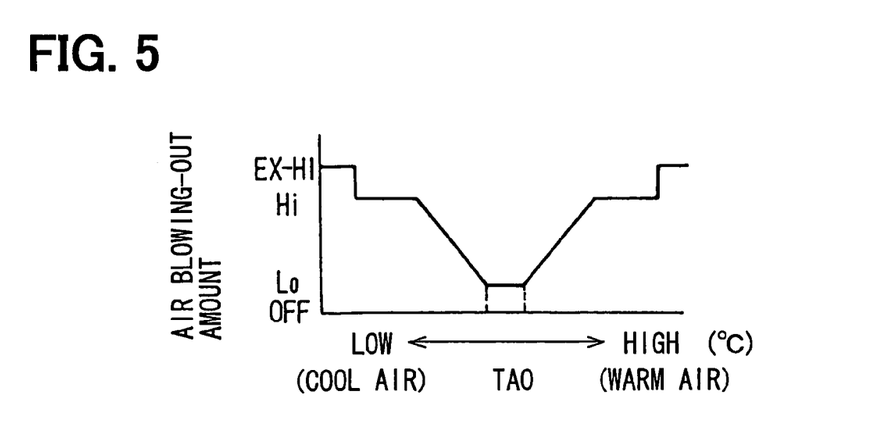
FIG. 5 is a graph showing a relationship between an air blowing-out amount and a target blowing-out temperature of the air conditioning unit according to the first embodiment.
Figure 6:
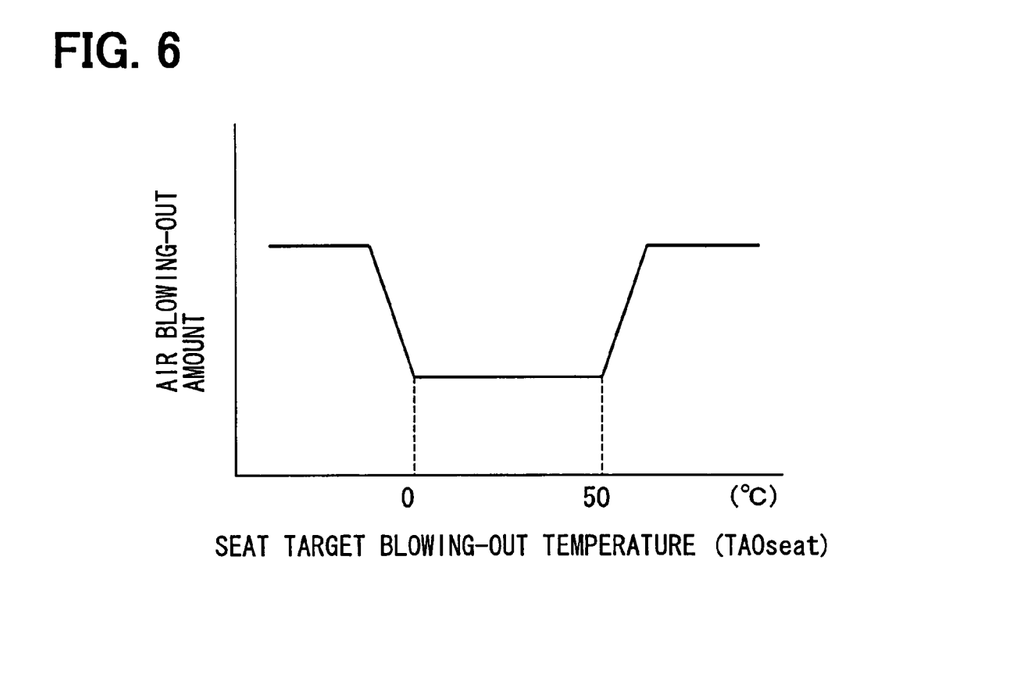
FIG. 6 is a graph showing a relationship between an air blowing-out amount and a seat target blowing-out temperature of the seat air conditioning unit according to the first embodiment.

Next, the air-conditioning control of the ECU 37 through the program is described with reference to FIG. 4. At first, when the A/C switch 48 of the air conditioner operation panel 44 and the seat air conditioner operation switch 57 of the seat air conditioner operation panel 54 are operated, an initialization process for initializing a counter or a flag which will be used in the following calculation is performed at step 100.

Then, step 110 is performed after step 100. At step 110, the compartment setting temperature Tset and the seat setting temperature Sset, which are set by the passenger respectively through the compartment temperature setting switch 53 and the seat temperature setting switch 55, are read in. Moreover, at step 110, the inside air temperature Tr, the outside temperature Tam, the solar radiation amount Ts and the seat blowing-out temperature To, which are respectively detected by the inside air temperature sensor 38, the outside air temperature sensor 39, the solar radiation sensor 40 and the seat blowing-out temperature sensor 47, are read in.

Then, step 120 (target blowing-out temperature calculation unit) will be performed. At step 120, a target blowing-out temperature TAO of the air conditioning unit 21 is calculated based on the following formula (1). The air conditioning unit 21 will maintain the passenger compartment at the compartment setting temperature Tset set by the passenger, according to the target blowing-out temperature TAO.

$$TAO = K1 \times Tset - K2 \times Tr - K3 \times Tam - K4 \times Ts + C \quad (1)$$

Wherein, C is a constant, and K1, K2, K3 and K4 are coefficients.

According to the formula (1), the air-conditioning control method of the operation mode, the blowing-out temperature, the air blowing-out amount and the like of conditioned air, which is blown to the passenger compartment by the air conditioning unit 21, can be determined.

After step 120, steps 130 and 140 will be performed. At step 130, the air-conditioning control of the air conditioning unit 21 is performed. Specifically, according to the target blowing-out temperature TAO, blowing-out modes for switching the control doors 34-36 and air introduction modes for switching the intake ports 24a, 24b, 23a and 23b are automatically set, while a target opening degree of the air mixing door 29 is calculated so that temperature of conditioned air is controlled. Moreover, the air blowing-out amount of the blower 26 is controlled according to the relationship (shown in FIG. 5) between the target blowing-out temperature TAO and the air blowing-out amount. Thus, conditioned air which is blown into the passenger compartment can be adjusted to the compartment setting temperature Tset.

In the case where a large cooling/heating capacity is required, for example, immediately after the vehicle is started, the air-conditioning control of the air conditioning unit 21 is performed so that a large amount of air is blown out (that is, air blowing-out amount is large) to make the passenger in the passenger compartment feel comfortable as soon as possible. When the inside air temperature Tr approaches the compartment setting temperature Tset, the air blowing-out amount will be reduced.

Moreover, a warming-up control (e.g., in a vehicle start in winter) and a delay control (e.g., in a vehicle start in summer) are performed prior to the above-described air controlling control of the air controlling unit 21. The warming-up control is performed to gradually increase the air blowing-out amount from zero responding to a warmness degree of engine cooling water in the winter start or the like, so that the uncomfortableness of the passenger due to blowing-out of cold air can be relieved. The delay control (i.e., cooling-down control) is performed to begin to blow air after the evaporator 28 is sufficiently cooled, so that the uncomfortableness of the passenger due to blowing-out of warm air is relieved.

On the other hand, step 140 (seat target blowing-out temperature calculation unit) is performed for the air-conditioning control of the seat air conditioning unit 4. At step 140, a seat target blowing-out temperature TAOseat (corresponding to seat target temperature) of the seat air conditioning unit 4 is calculated according to a following formula (2) by using the target blowing-out temperature TAO, which has been calculated based on the formula (1) at step 120.

$$TAOseat = K5 \times TAO + \alpha - K6 \times Sset - Kn \times H \quad (2)$$

Wherein, K5, K6 and Kn are coefficient, and H is a heat load correction term.

The heat load correction term H is constituted by at least one of heat loads of the seat 3. The heat loads of the seat 3, for example, the solar radiation amount Ts, the seat blowing-out temperature To, the inside air temperature Tr and the outside air temperature Tam, can be respectively detected by the solar radiation sensor 40, the seat blowing-out temperature sensor 47, the inside air temperature sensor 38, the outside air temperature sensor 39 and the like, which constitute a seat heat-load detecting device. The detection values of the seat heat-load detecting device are to be sent to the ECU 37.

According to the formula (2), a basic term including the target blowing-out temperature TAO is corrected by a correction term including the term of the seat setting temperature Sset and the heat load correction term H which is constituted by at least one of the heat loads (detection values of heat loads) of the seat 3, so that the seat target blowing-out temperature TAOseat is determined.

In this case, $\alpha$ is a difference between the compartment setting temperature Tset of the air conditioning unit 21 and the seat setting temperature Sset of the seat air conditioning unit 4. For example, in the case where the seat setting temperature Sset is 36° C. and the compartment setting temperature Tset is 25° C., $\alpha$ is 11° C.

That is, in the formula (2), the seat target blowing-out temperature TAOseat in expectation of a temperature increase and a temperature decrease is calculated based on the seat setting temperature Sset and at least one of the heat loads of the seat 3. The detection values of the heat loads of the seat 3, which are detected by the sensors 38-40 and the like, are read in at step 110. Thus, the seat target blowing-out temperature TAOseat of conditioned air of the seat 3 can be calculated responding to the air conditioning operation of the air conditioning unit 21, through an introduction of the target blowing-out temperature TAO of the passenger compartment into the calculation of the seat target blowing-out temperature TAOseat.

In this case, the coefficients K5, K6 and Kn are set, so that the target blowing-out temperature TAO is more reflected in the seat target blowing-out temperature TAOseat when the difference between the target temperature TAO and the compartment setting temperature Tset is larger. That is, the larger the difference between the target temperature TAO and the compartment setting temperature Tset, the larger the influence of the target blowing-out temperature TAO on the seat target blowing-out temperature TAOseat.

Then, at step 150, the air conditioning control of the seat air conditioning unit 4 is performed. Specifically, the opening degrees of the control doors 42 and 43 are adjusted to control temperature of conditioned air for the seat 3, based on the seat target blowing-out temperature TAOseat having been calculated. Moreover, the air blowing-out amount of the blower 41 is controlled based on the relationship (shown in FIG. 6) between the seat target blowing-out temperature TAOseat and the air blowing-out amount of the blower 41. Thus, conditioned air which is blown to the seat 3 can be adjusted to the seat setting temperature Sset.

When the air conditioning control of the air conditioning unit 21 is in a transient state where the difference between the target blowing-out temperature TAO and the compartment setting temperature Tset is relatively large, the seat target blowing-out temperature TAOseat is more influenced by the target blowing-out temperature TAO in the calculation at step 140. Thus, the air conditioning control of the seat air conditioning unit 4 is also in a transient state, where temperature of conditioned air for the seat 3 is relatively low at a cooling operation or relatively high at a heating operation thereof.

On the other hand, when the air conditioning control of the air conditioning unit 21 is in a steady state where the difference between the target blowing-out temperature TAO and the compartment setting temperature Tset is relatively small, the reflection of the target blowing-out temperature TAO in the seat target blowing-out temperature TAOseat will be reduced according to the calculation at step 140. Thus, the seat air conditioning unit 4 is also in a steady state.

For example, in the case where the target blowing-out temperature TAO of the cooling-down control (e.g., in summer) is substantially in a range from −70° C. to 0° C. or that of the warming-up control (e.g., in winter) is substantially in a range from 120° C. to 50° C., the operation state of the seat air conditioning unit 4 can be controlled to correspond to that of the air conditioning unit 21 when the coefficients in the formula (2) is set so that the correction term is substantially in the range from +40 to −40. That is, when the air conditioning unit 21 is in the transient state, the seat air conditioning unit 4 is controlled to be in the transient state thereof. When the air conditioning unit 21 is in the steady state, the seat air conditioning unit 4 is controlled to be in the steady state thereof.

Thus, when the air conditioning unit 21 is in the steady state, the seat blowing-out temperature To of air blown to the seat 3 is adjusted based on the seat target blowing-out temperature TAOseat, in which the heat loads of the seat 3 is reflected. Moreover, the air blowing-out amount of the seat air conditioning unit 4 is adjusted to restrict an excessive cooling or an excessive heating of the seat 3.

After steps 130 and 150 are performed, the control program returns to step 110, and the ECU 37 performs the air conditioning control of the air conditioning unit 21 and the seat air conditioning unit 4 by repeating the above-described control operation.

According to this embodiment, in the calculation of the seat target blowing-out temperature TAOseat performed by the ECU 37 at step 140, the target blowing-out temperature TAO is more reflected in the seat target blowing-out temperature TAOseat when the difference between the target blowing-out temperature TAO and the compartment setting temperature Tset is larger.

Thus, when the air conditioning unit 21 is in the transient state where the difference between the target blowing-out temperature TAO and the compartment setting temperature Tset is relatively large, the seat target blowing-out temperature TAOseat is more affected by the target blowing-out temperature TAO in the calculation (referring to formula (2), for example) of the seat target blowing-out temperature TAOseat. On the other hand, when the air conditioning unit 21 is in the steady state where the difference between the target blowing-out temperature TAO and the compartment setting temperature Tset is relatively small, the reflection of the target blowing-out temperature TAO in the seat target blowing-out temperature TAOseat becomes small in the calculation thereof.

In this embodiment, the difference between the target blowing-out temperature TAO and the compartment setting temperature Tset is used as a value indicating a degree (i.e., deviation degree from the steady state) of the transient state. The larger the value, the more the deviation of the transient state from the steady state. In the calculation of the seat target blowing-out temperature TAOseat by the seat target blowing-out temperature calculation unit (step 14), the degree of influence of the target blowing-out temperature TAO on the seat target blowing-out temperature TAOseat is determined by the value indicating the degree of the transient state. In this case, when the value is larger, the seat target blowing-out temperature TAOseat is more influenced by the target blowing-out temperature TAO.

As described above, the seat air conditioning unit 4 is controlled at step 150, based on the seat target blowing-out temperature TAOseat having been calculated. Accordingly, when the operation state of the air conditioning unit 21 is in the steady state, the excessive cooling operation and the excessive heating operation of the seat air conditioning unit 4 can be restricted, even without determining the operation state (transient state or steady state) of the air conditioning unit 21. Comparatively, the determining of the transient state and the steady state of the air conditioning unit 21 is performed in the related art.

In this case, the coefficient Kn of the heat load correction term H in the formal (2) can be also a variable instead of the constant. The variable can be a function (referring to FIG. 7) of the heat load such as the inside air temperature Tr. Thus, when the difference between the target blowing-out temperature TAO and the compartment setting temperature Tset (that is, operation state of air conditioning unit 21 approaches steady state) is smaller, the reflection degree of the correction term (heat load correction term H) in the seat target blowing-out temperature TAOseat becomes larger due to the variation of the coefficient Kn. Therefore, the reflection degree of the basic term including the target blowing-out temperature TAO, which is corrected by the correction term, in the seat target blowing-out temperature TAOseat becomes smaller.

Thus, when the operation state of the air conditioning unit 21 is in the steady state, the excessive cooling operation and the excessive heating operation of the seat air conditioning unit 4 can be further substantially restricted.

Figure 7:
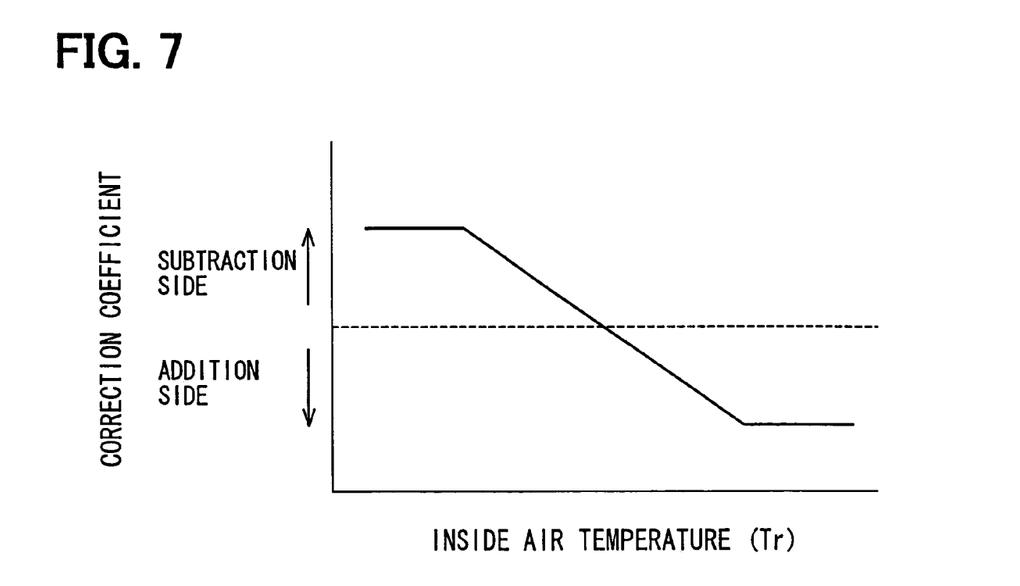
FIG. 7 is a graph showing that a coefficient of a correction term in a calculation of the seat target blowing-out temperature is variable responding to a heat load of a seat according to the first embodiment.

Moreover, a hysteresis can be also provided for the setting value of the coefficient of the correction term shown in FIG. 7, to relieve a deterioration of an air conditioning feeling of the passenger.

Second Embodiment

In the above-described first embodiment, the seat target blowing-out temperature TAOseat is calculated by the ECU 37 according to the formula (2), where the basic term of the target blowing-out temperature TAO is corrected by the correction term including the seat setting temperature Sset and the heat load correction term H. In this case, the larger the difference between the target temperature TAO and the compartment setting temperature Tset, the larger the reflection of the target blowing-out temperature TAO in the seat target blowing-out temperature TAOseat.

According to a second embodiment of the present invention, the seat target blowing-out temperature TAOseat can be also calculated based on other formulas.

For example, in the calculation of the seat target blowing-out temperature TAOsea according to formula (3), the difference between the target blowing-out temperature TAO and the compartment setting temperature Tset can be used as the coefficient of at least one of the seat setting temperature Sset and the heat load correction term H, which is constituted by at least one of the detection values of the heat loads (e.g., Ts, To, Tr, Tam) of the seat 3.

$$TAOseat = K7 \times (TAO - Tset) \times Sset - Kn \times H \tag{3}$$

Wherein, K7 is a coefficient.

As a first modification of the second embodiment, the seat target blowing-out temperature TAOseat can be also calculated based on a formula (4). In this case, the seat setting temperature Sset is used as the basic term, which is corrected by the term of the target blowing-out temperature TAO and the heat load correction term H.

$$TAOseat = K8 \times Sset - K9 \times TAO - Kn \times H \tag{4}$$

Wherein, K8 and K8 are coefficients.

According to the formula (2) described in the first embodiment, the basic term including the target blowing-out temperature TAO is corrected by the term of the seat setting temperature Sset and the heat load correction term H. According to a second modification of the second embodiment, the seat target blowing-out temperature TAOseat can be also calculated based on a formula (5), where the basic term including the target blowing-out temperature TAO is corrected only by the heat load correction term H.

$$TAOseat = K5 \times TAO + \alpha - Kn \times H \quad (5)$$

Wherein, K5, and Kn are coefficients.

That is, in the first embodiment, the seat target blowing-out temperature calculation unit (step 140) calculates the seat target blowing-out temperature TAOseat based on the target blowing-out temperature TAO calculated by the target blowing-out temperature calculation unit (step 120), the detection values of the seat heat loads (e.g., Ts, To, Tr and Tam) which constitute the heat load correction term H, and the seat setting temperature Sset set by the passenger through the seat temperature setting switch 55.

According to the formula (5), the seat target blowing-out temperature TAOseat can be calculated based on the target blowing-out temperature TAO calculated by the target blowing-out temperature calculation unit (step 120), and the detection values of the seat heat loads (e.g., Ts, To, Tr and Tam). Therefore, the seat setting temperature Sset set by the passenger is not required for the calculation of the seat target blowing-out temperature TAOseat based on the formula (5).

Third Embodiment

In the first embodiment, the larger the difference between the target temperature TAO and the compartment setting temperature Tset, the larger the reflection (influence) of the target blowing-out temperature TAO in the seat target blowing-out temperature TAOseat, which is calculated based on the formula (2).

That is, in this case, the compartment setting temperature Tset is used as a criterion of the alienation degree of the target blowing-out temperature TAO. The larger the alienation degree (difference) of the target blowing-out temperature TAO from the compartment setting temperature Tset, the larger the degree (i.e., deviation degree from steady state) of the transient state of the air conditioning unit 21. A larger degree of the transient state means that the operation state of the air conditioning unit 21 more deviates from the steady state thereof.

Thus, the difference between the target blowing-out temperature TAO and the compartment setting temperature Tset can be used as a value indicating the degree of the transient state. The larger the value, the larger the deviation of the transient state from the steady state. Thus, the operation state (transient state or steady state) of the air conditioning unit 21 can be determined based on the target blowing-out temperature TAO.

For example, as described above, in the case where the target blowing-out temperature TAO at the cooling-down control (e.g., in summer) is substantially in the range from −70° C. to 0° C. and that at the warming-up control (e.g., in winter) is substantially in the range from 50° C. to 120° C., it is determined that the operation state is in the transient state with the criterion of the compartment setting temperature Tset. In the case where the target blowing-out temperature TAO is substantially in a range from 0° C. to 50° C., it is determined that the operation state is in the steady state with the criterion of the compartment setting temperature Tset.

According to a third embodiment of the present invention, one of the insider air temperature Tr immediately after the start of the air-conditioning control, a seat temperature (detected by seat temperature detection unit) of the seat 3 immediately after the start of the air-conditioning control, the seat setting temperature Sset immediately after the start of the air-conditioning control, and the like can be also used as the value indicating the degree of the transient state, instead of the difference between the target blowing-out temperature TAO and the compartment setting temperature Tset. In this case, the coefficients in the formula for calculating the seat target blowing-out temperature TAOseat can be set, so that the seat target blowing-out temperature TAOseat is more influenced by the target blowing-out temperature TAO when the value indicating the degree of the transient state is larger.

Thus, in the calculation of the seat target blowing-out temperature TAOseat by the seat target blowing-out temperature calculation unit (step 140), the larger the value indicating the degree of the transient state, the larger the reflection of the target blowing-out temperature TAO in the seat target blowing-out temperature TAOseat.

According to the calculation of the seat target blowing-out temperature TAOseat described in the present invention, the reflection degree of the target blowing-out temperature TAO in the seat target blowing-out temperature TAOseat is determined by the value indicating the deviation degree of the transient state.

In the calculation of the seat target blowing-out temperature TAOseat, the term of the target blowing-out temperature TAO is multiplied by a coefficient, which is a function of the value indicating the degree of the transient state.

In the calculation of the seat target blowing-out temperature TAOseat, the term of the target blowing-out temperature TAO, and the correction term for correcting the term of the target blowing-out temperature TAO are provided. The correction term is multiplied by the coefficient, which is the function of the value indicating the degree of the transient state.

As described in the above-described embodiments, the value indicating the degree of the transient state can be the difference between the target blowing-out temperature TAO and the compartment setting temperature Tset. In the calculation of the seat target blowing-out temperature TAOseat by the seat target blowing-out temperature calculation unit (step 140), the larger the difference between the target temperature TAO and the compartment setting temperature Tset, the larger the reflection of the target blowing-out temperature TAO in the seat target blowing-out temperature TAOseat.

Other Embodiment

Although the present invention has been fully described in connection with the preferred embodiments thereof with reference to the accompanying drawings, it is to be noted that various changes and modifications will become apparent to those skilled in the art.

In the above-described embodiments, the compartment setting temperature Tset which is set by the passenger is used as the criterion for determining the alienation degree of the target blowing-out temperature TAO. However, a constant, for example, 25° C., can be also used as the criterion for determining the alienation degree of the target blowing-out temperature TAO. That is, the larger the alienation degree of the target blowing-out temperature TAO from the constant (e.g., 25° C.), the larger the degree of the transient state of the air conditioning unit 21. In this case, the difference between the target blowing-out temperature TAO and the constant is used as the value indicating the degree of the transient state in the calculation of the seat target blowing-out temperature TAOseat.

Moreover, in the above-described embodiments, the seat air conditioning unit 4 is constructed to introduce conditioned air from the air conditioning unit 21. However, the seat air conditioning unit 4 and the air conditioning unit 21 can be also separately constructed, so that ventilation systems thereof are independent of each other.

Furthermore, the heat load correction term H is constituted by at least one of the heat loads (e.g., solar radiation amount Ts, seat blowing-out temperature To, inside air temperature Tr, outside air temperature Tam and seat temperature) of the seat 3. For example, the heat load correction term H can be constituted by the detection value of the solar radiation amount Ts.

Moreover, in the above-described embodiments, the seat air conditioning unit 4 is constructed to blow conditioned air from the seat 3. However, the seat air conditioning unit 4 can be also constructed to control the surface temperature of the seat 3 without blowing conditioned air. In this case, the seat air conditioning unit 4 can be provided with any structure capable of controlling the seat temperature. For example, the seat air conditioning unit 4 can be a seat heater.

Such changes and modifications are to be understood as being in the scope of the present invention as defined by the appended claims.

What is claimed is:

1. An air conditioner for a vehicle, comprising:
   an air conditioning unit for blowing conditioned air to a passenger compartment of the vehicle;
   at least one seat air conditioning unit for controlling temperatures of seats of the vehicle;
   a compartment heat-load detecting device for detecting heat loads of the passenger compartment and outputting detection values corresponding to the heat loads of the passenger compartment;
   a seat heat-load detecting device, by which heat loads of the seat is detected, the seat heat-load detecting device outputting detection values corresponding to the heat loads of the seat;
   a compartment temperature setting unit, through which a compartment setting temperature of the passenger compartment is set by a passenger; and
   a control unit, by which air conditioning controls of the air conditioning unit and the seat air conditioning unit are performed and introduced into a steady state from a transient state responding to the detection values of the heat loads of the passenger compartment, wherein:
   the control unit includes a target blowing-out temperature calculation unit and a seat target blowing-out temperature calculation unit, the target blowing-out temperature calculation unit calculating a target blowing-out temperature of the temperature-conditioned air based on the detection values of the heat loads of the passenger compartment and the compartment setting temperature, the seat target blowing-out temperature calculation unit calculating a seat target blowing-out temperature of the seat based on at least the target blowing-out temperature and one of the detection values of the heat loads of the seat; and
   in a calculation of the seat target blowing-out temperature by the seat target blowing-out temperature calculation unit, the seat target blowing-out temperature is more influenced by the target blowing-out temperature when a value indicating a degree of the transient state indicates that the air conditioning control more deviates from the steady state.

2. The air conditioner according to claim 1, wherein
   a term of the target blowing-out temperature, which is multiplied by a coefficient, is provided in the calculation of the seat target blowing-out temperature, the coefficient being a function of the value indicating the degree of the transient state.

3. The air conditioner according to claim 1, wherein
   a term including the target blowing-out temperature and a correction term for correcting the term including the target blowing-out temperature are provided in the calculation of the seat target blowing-out temperature, the correction term being multiplied by a coefficient, which is a function of the value indicating the degree of the transient state.

4. The air conditioner according to claim 1, further comprising
   at least one of an inside air temperature detecting unit for detecting an inside air temperature of the passenger compartment, a seat temperature detecting unit for detecting a seat temperature of the seat, and a seat temperature setting unit, through which a seat setting temperature of the seat is set by the passenger, wherein
   the value which indicates the degree of the transient state is one of the inside air temperature immediately after a start of the air conditioning control, the seat temperature immediately after the start of the air conditioning control, and the seat setting temperature immediately after the start of the air conditioning control.

5. The air conditioner according to claim 1, wherein
   the value which indicates the degree of the transient state is a difference between the target blowing-out temperature and a constant.

6. The air conditioner according to claim 1, wherein
   the target blowing-out temperature is used as a basic term which is corrected by at least one of the detection values of the heat loads of the seat, in the calculation of the seat target blowing-out temperature by the seat target blowing-out temperature calculation unit.

7. The air conditioner according to claim 1, further comprising
   a seat temperature setting unit, through which a seat setting temperature of the seat is set by the passenger, wherein
   the seat target blowing-out temperature is calculated by the seat target blowing-out temperature calculation unit based on the target blowing-out temperature, the seat setting temperature and at least one of the detection values of the heat loads of the seat.

8. The air conditioner according to claim 7, wherein
   the target blowing-out temperature is used as a basic term which is corrected by a correction term, in the calculation of the seat target blowing-out temperature by the seat target blowing-out temperature calculation unit, the correction term including the seat setting temperature and at least one of the detection values of the heat loads of the seat.

9. The air conditioner according to claim 8, wherein
   the difference between the target blowing-out temperature and the compartment setting temperature is used as a coefficient of at least one of the target blowing-out temperature, the seat setting temperature and the detection value of the heat load of the seat, in the calculation of the seat target blowing-out temperature by the seat target blowing-out temperature calculation unit.

10. The air conditioner according to claim 7, wherein
    the seat setting temperature is used as a basic term which is corrected by at least one of the detection values of the heat loads of the seat, in the calculation of the seat target blowing-out temperature by the seat target blowing-out temperature calculation unit.

11. The air conditioner according to claim 10, wherein the difference between the target blowing-out temperature and the compartment setting temperature is used as a coefficient of one of the seat setting temperature and the detection value of the heat load of the seat.

12. The air conditioner according to claim 7, wherein the seat setting temperature is used as a basic term which is corrected by a correction term, the correction term including the target blowing-out temperature and at least one of the detection values of the heat loads of the seat, in the calculation of the seat target blowing-out temperature by the seat target blowing-out temperature calculation unit.

13. The air conditioner according to claim 12, wherein the difference between the target blowing-out temperature and the compartment setting temperature is used as a coefficient of at least one of the seat setting temperature, the target blowing-out temperature and the detection value of the heat load of the seat.

14. An air conditioner for a vehicle, comprising:
an air conditioning unit for blowing temperature-conditioned air to a passenger compartment of the vehicle;
at least one seat air conditioning unit for controlling temperatures of seats of the vehicle;
a compartment heat-load detecting device for detecting heat loads of the passenger compartment and outputting detection values corresponding to the heat loads of the passenger compartment;
a seat heat-load detecting device, by which heat loads of the seat is detected, the seat heat-load detecting device outputting detection values corresponding to the heat loads of the seat;
a compartment temperature setting unit, through which a compartment setting temperature of the passenger compartment is set by a passenger; and
a control unit, by which air conditioning controls of the air conditioning unit and the seat air conditioning unit are performed and introduced into a steady state from a transient state responding to the detection values of the heat loads of the passenger compartment, wherein:
the control unit includes a target blowing-out temperature calculation unit and a seat target blowing-out temperature calculation unit, the target blowing-out temperature calculation unit calculating a target blowing-out temperature of the temperature-conditioned air based on the detection values of the heat loads of the passenger compartment and the compartment setting temperature, the seat target blowing-out temperature calculation unit calculating a seat target blowing-out temperature of the seat based on at least the target blowing-out temperature and one of the detection values of the heat loads of the seat; and
the seat target blowing-out temperature is influenced by the target blowing-out temperature in a calculation of the seat target blowing-out temperature by the seat target blowing-out temperature calculation unit, a degree of influence of the target blowing-out temperature on the seat target blowing-out temperature being determined by a value indicating a degree of the transient state.

15. The air conditioner according to claim 14, wherein a term of the target blowing-out temperature, which is multiplied by a coefficient, is provided in the calculation of the seat target blowing-out temperature, the coefficient being a function of the value indicating the degree of the transient state.

16. An air conditioner for a vehicle, comprising:
an air conditioning unit for blowing temperature-conditioned air to a passenger compartment of the vehicle;
at least one seat air conditioning unit for controlling temperatures of seats of the vehicle;
a compartment heat-load detecting device for detecting heat loads of the passenger compartment and outputting detection values corresponding to the heat loads of the passenger compartment;
a seat heat-load detecting device, by which heat loads of the seat is detected, the seat heat-load detecting device outputting detection values corresponding to the heat loads of the seat;
a compartment temperature setting unit, through which a compartment setting temperature of the passenger compartment is set by a passenger; and
a control unit, by which air conditioning controls of the air conditioning unit and the seat air conditioning unit are performed and introduced into a steady state from a transient state responding to the detection values of the heat loads of the passenger compartment, wherein:
the control unit includes a target blowing-out temperature calculation unit and a seat target blowing-out temperature calculation unit, the target blowing-out temperature calculation unit calculating a target blowing-out temperature of the conditioned air based on the detection values of the heat loads of the passenger compartment and the compartment setting temperature, the seat target blowing-out temperature calculation unit calculating a seat target blowing-out temperature of the seat based on at least the target blowing-out temperature and one of the detection values of the heat loads of the seat; and
the larger the difference between the target blowing-out temperature and the compartment setting temperature, the greater the influence of the target blowing-out temperature on the seat target blowing-out temperature in a calculation of the seat target blowing-out temperature by the seat target blowing-out temperature calculation unit.

17. The air conditioner according to claim 16, further comprising
a seat temperature setting unit, through which a seat setting temperature of the seat is set by the passenger, wherein
the seat target blowing-out temperature is calculated by the seat target blowing-out temperature calculation unit based on the target blowing-out temperature, the seat setting temperature and at least one of the detection values of the heat loads of the seat.

* * * * *